United States Patent [19]

Zandona

[11] Patent Number: 5,631,334
[45] Date of Patent: May 20, 1997

[54] PROCESS FOR THE MANUFACTURE OF A CATALYTIC SOLID, CATALYTIC SOLID AND PROCESS FOR (CO)POLYMERISATION OF OLEFINS BY MEANS OF THIS CATALYTIC SOLID

[75] Inventor: Nicola Zandona, Waterloo, Belgium

[73] Assignee: Solvay (Société Anonyme), Brussels, Belgium

[21] Appl. No.: 412,412

[22] Filed: Mar. 27, 1995

Related U.S. Application Data

[63] Continuation of Ser. No. 72,943, Jun. 8, 1993, abandoned.

[30] Foreign Application Priority Data

Jun. 9, 1992 [BE] Belgium .................. 09200532

[51] Int. Cl.$^6$ .................................................. C08F 4/655
[52] U.S. Cl. ................ 526/113; 526/114; 526/116; 526/118; 526/119; 526/123.1; 526/124.3; 526/124.4; 526/124.5; 526/124.7; 526/124.8; 502/104; 502/107; 502/111; 502/113; 502/151; 502/169; 502/224; 502/226; 502/227; 502/231
[58] Field of Search .................... 502/104, 107, 502/110, 113, 111, 151, 169, 224, 226, 227, 231; 526/113, 114, 116, 118, 119, 123.1, 124.3, 124.4, 124.5, 124.7, 124.8

[56] References Cited

U.S. PATENT DOCUMENTS

| | | | |
|---|---|---|---|
| 3,494,873 | 2/1970 | Vohwinkel et al. ................ 252/429 |
| 4,121,030 | 10/1978 | Candlin et al. .................. 526/119 |
| 4,136,057 | 1/1979 | Candlin et al. .................. 252/429 B |
| 4,218,339 | 8/1980 | Zucchini et al. ................. 252/429 B |

FOREIGN PATENT DOCUMENTS

| | | |
|---|---|---|
| 0294168 | 12/1988 | European Pat. Off. . |
| 1460233 | 11/1966 | France . |

OTHER PUBLICATIONS

Helena Antropiusová et al, "Preparation Of Hologen–Modified Titanium (II) Arene Complexes and Their Electronic Spectra", *Transition Met. Chem.*, 1978, pp. 127–130.

S. Pasynkiewicz et al, "The Synthesis Of Titanium (II) Complexes Containing Methylbenzene Ligands", *Journal of Organometallic Chemistry*, 54, 1973, pp. 203–205.

Primary Examiner—Romulo H. Delmendo
Attorney, Agent, or Firm—Spencer & Frank

[57] ABSTRACT

Catalytic solid for the (co)polymerisation of at least one olefin, comprising a coprecipitate of magnesium and of at least one transition metal, obtained by means of a process comprising the preparation of a mixture of a magnesium compound, such as the chloride or a magnesium alcoholate, and of a compound denoted by one of the formulae $MY_x(O-R')_{t-x}$ and $M'O_y(O-R'')_{s-2y}$ and the treatment of the resulting mixture with a complex of formula $M''(A)Al_2(X', X'')_8$ where X' and X" denote halogens, M and M' transition metals of groups IVB and VB, M" a transition metal of group IVB, A an aromatic hydrocarbon, Y a halogen or a group (O—R'''), and R', R" and R''' an alkyl, aryl or cycloalkyl group.

28 Claims, No Drawings

PROCESS FOR THE MANUFACTURE OF A CATALYTIC SOLID, CATALYTIC SOLID AND PROCESS FOR (CO)POLYMERISATION OF OLEFINS BY MEANS OF THIS CATALYTIC SOLID

This application is a continuation, of application Ser. No. 08/072,943, Filed Jun 8, 1993, now abandoned.

The present invention relates to a process for the manufacture of a catalytic solid of the Ziegler-Natta type, comprising a magnesium compound and at least one compound of a transition metal, more particularly a titanium compound. The invention also relates to catalytic solids and to their use for the polymerisation of olefins, typically of ethylene.

In U.S. Pat. No. 4,218,339 (Montedison S.p.A.), a process is described for the manufacture of a catalytic solid for the polymerisation of olefins, according to which certain magnesium compounds such as magnesium chloride are mixed with certain compounds of transition metals chosen from titanium, zirconium and vanadium, such as titanium tetrabutylate, the mixture thus obtained is halogenated and reduced with the aid of a silicon halogen and hydrogen compound acting as reducing-halogenating agent, and the catalytic solid is isolated from the reaction mixture.

In this known process the reaction of reduction and halogenation of the compound formed by the reaction of titanium tetrabutylate with magnesium chloride is often incomplete, with the result that a not insignificant part of the transition metal compound remains in its initial valency state (tetravalent or pentavalent). This has the effect of reducing the activity of the catalytic solid when it is employed in olefin polymerisation.

The invention remedies the disadvantages of the known process described above by providing a new process which makes it possible to obtain catalytic solids exhibiting a high activity when employed for the polymerisation of olefins. The invention also makes it possible to manufacture catalytic solids which have a low content of aluminium. Furthermore, the invention makes it possible to obtain catalytic solids comprising a number of transition metals and this thus widens the molecular weight range of the polyolefins produced when they are employed in olefin polymerisation.

Consequently, the invention relates to a process for the manufacture of a catalytic solid, according to which a) a mixture is prepared comprising, on the one hand, at least one magnesium compound chosen from Mg oxide and compounds of formulae $MgX_n(O-R)_{2-n}$ and, on the other hand, at least one transition metal compound chosen from compounds of formulae $MY_x(O-R')_{t-x}$ and $M'O_y(O-R'')_{s-2y}$ in which X denotes a halogen each of M and M' denotes a transition metal from groups IVB and VB of the Periodic Table, the valency of which is at least equal to 4

Y denotes a halogen or a group (O—R''')

each of R, R', R'' and R''' denotes an optionally substituted alkyl, aryl or cycloalkyl group $0 \leq n \leq 2$ $0 \leq x \leq t$, t being equal to the valency of M $0 \leq y \leq s/2$, s being equal to the valency of M', b) the mixture thus obtained is reduced and halogenated by means of a reducing-halogenating agent, and c) the precipitated catalytic solid thus obtained is isolated from the reaction mixture;

according to the invention, the reducing-halogenating agent comprises at least one complex of empirical formula $M''(A)Al_2(X',X'')_8$ in which M'' denotes a transition metal of group IVB of the Periodic Table A denotes an aromatic hydrocarbon each of X' and X'' denotes a halogen.

In the process according to the invention the magnesium compounds corresponding to the formula $MgX_n(O-R)_{2-n}$ are preferably chosen from those in which the group R contains up to 20 carbon atoms. They may be selected from magnesium monoalcoholates such as $MgCl(OC-C_2H_5)$ and $MgCl(O-C_4H_9)$, magnesium dialcoholates such as $Mg(O-C_2H_5)_2$ and $Mg(O-C_4H_9)_2$ and magnesium dihalides such as $MgCl_2$. Magnesium compounds which are especially preferred are magnesium dichloride and magnesium diethylate.

In the process according to the invention the transition metal compounds denoted by the formulae $My_x(O-R')_{t-x}$ and $M'O_y(O-R'')_{s-2y}$ are preferably chosen from those in which the group R' or R'' contains up to 20 carbon atoms. They are preferably chosen from those in which the transition metal M or M' is titanium, zirconium or vanadium. In the case where Y denotes a halogen, the latter is preferably chlorine and, in the case where Y denotes a group (O—R'''), R''' is chosen from alkyl, aryl or cycloalkyl groups containing up to 20 carbon atoms. In the case where the transition metal is titanium these compounds may be selected from tetravalent titanium compounds, for example titanium alcoholates such as $Ti(O-C_2H_5)_4, Ti(O-C_4H_9)_4, Ti(O-C_3H_7)_4, Ti(O-C_5H_5)_4$ and $Ti(O-CH_3)_2(O-C_2H_5)_2$ and titanium haloalcoholates such as $TiCl(O-C_4H_9)_3$. In the case where the transition metal is vanadium it is possible, for example, to mention $V(O-C_3H_7)_4$ and $VO(O-C_3H_7)_3$. $Zr(O-C_2H_5)_4$ and $Zr(O-C_4H_9)_2(O-C_3H_7)_4$ may be mentioned, for example, as zirconium compound. Particularly satisfactory results are obtained with titanium tetrabutylate and vanadium tetrabutylate.

In the process according to the invention the reducing-halogenating agent is a compound capable of acting not only as a halogenating agent substituting, for example, the groups (O—R), (O—R') and (O—R'') respectively in the compounds $MgX_n(O-R)_{2-n}, MY_x(O-R')_{t-x}$ and $M'O_y(O-R'')_{s-2y}$ with a halogen, but also as a reducing agent decreasing the valency of the transition metal of the compound $MY_x(O-R')_{t-x}$ or $M'Oy(O-R'')_{s-2y}$. According to the invention this reducing-halogenating agent consists of a complex of a transition metal of group IVB of the Periodic Table, of general formula $M''(A)Al_2(X',X'')_8$. The transition metal M'' is advantageously chosen from titanium and zirconium. The transition metal in this reducing-halogenating agent is in the divalent state. Since this divalent state is unstable, the complex is stabilised with an aromatic hydrocarbon (A). This aromatic hydrocarbon is preferably benzene or a substituted derivative of the latter, containing not more than 12 carbon atoms, such as toluene, mesitylene or tetra-, penta- or hexamethylbenzene. Toluene is suitable. Other aromatic hydrocarbons can also be employed and especially polycyclic aromatic hydrocarbons containing not more than 20 carbon atoms, it being possible for each ring to be substituted- In the reducing-halogenating agent the halogen atoms X' and X'' may be identical or different. Chlorine is preferred. The reducing-halogenating agents which are especially preferred are those corresponding to the empirical formulae $Ti(toluene)Al_2Cl_8$ and $Zr(toluene)Al_2Cl_8$.

In the process according to the invention the reducing-halogenating agent may be prepared, in a known manner, by direct synthesis, by reacting a transition metal halide (for example titanium tetrachloride), metallic aluminium, an aluminium halide and an aromatic hydrocarbon, in an organic compound. An organic compound is intended to denote a solvent of the aromatic hydrocarbon. In most cases the latter is the aromatic hydrocarbon itself. A suspension is thus obtained, from which the solid fraction is removed. The solution thus collected, which contains the complex M"(A) Al$_2$(X',X")$_8$, may be employed as it is during the process or the solvent may be removed from the solution and the resulting solid employed. The preparation of the reducing-halogenating agent is described, inter alia, in the publication Transition Met. Chem., 3, 1978, Verlag Chemie, GmbH, pages 127–130: "Preparation of halogen-modified titanium (II) arene complexes and their electronic spectra" and in the publication Journal of Organometallic Chemistry, 54, 1973, Elsevier Sequoia S.A., pages 203–205: "The synthesis of titanium(II) complexes containing methylbenzene ligands".

In a first stage of the process according to the invention the magnesium compound is mixed with the transition metal compound of formula MY$_x$(O—R')$_{t-x}$ or M'O$_y$(O—R")$_{s-2y}$ so that the magnesium compound forms a complex with the transition metal compound. The mixing is advantageously performed in an organic solvent the function of which is to facilitate the dispersion of the magnesium compound and of the transition metal compound, and optionally to dissolve the complex in the case where the latter is solid. The organic solvent may be chosen from aromatic, aliphatic and cycloaliphatic hydrocarbons, preferably containing 5 to 12 carbon atoms, and their mixtures, for example benzene, pentane or cyclohexane. Toluene or hexane is preferably employed. Quantities of the transition metal compound and of the magnesium compound used are advantageously such that the molar ratio (M or M')/Mg is higher than 0.5, preferably at least equal to 1, values of at least 2 being especially advantageous. It is desirable that the value of this ratio should not exceed 20 and should be preferably at most 15, values lower than 12 being especially advantageous. The temperature at which the mixture is prepared must be such that a solution is obtained after a reasonable time which may, for example, vary from half an hour to 12 hours, the reaction mixture being optionally stirred while remaining below the boiling temperature of the components of the mixture. The operating temperature consequently depends on the nature of the components of the mixture and may, for example, vary from room temperature up to approximately 170° C. The operation is preferably carried out at approximately 50° to 150° C.

In this stage of the process according to the invention it is possible to use more than one transition metal compound corresponding to the formulae MY$_x$(O—R')$_{t-x}$ or M'Oy(O—R")$_{s-2y}$ and/or more than one magnesium compound.

The second stage of the process according to the invention consists in reducing and halogenating the mixture obtained from the above mentioned first stage by placing it in contact with the reducing-halogenating agent. In the case where the reducing-halogenating agent is used in solid form, it is first of all dissolved in a diluent chosen from aromatic hydrocarbons such as benzene and its derivatives or polycyclic aromatic hydrocarbons, it being possible for each ring to be substituted. Toluene is particularly suitable. The quantities used are advantageously such that the molar ratio M"/(M or M') is higher than 0.1, preferably at least equal to 0.3, values lower than 5 being recommended and those from 0.3 to 1 being especially advantageous. The operating temperature and the duration of the reduction and halogenation reaction are not critical. In general this reaction is initiated at room temperature and the temperature then increases rapidly during the reaction between the mixture originating from the first stage and the reducing-halogenating complex, the reaction being instantaneous and exothermic. At the end of the reaction the reaction mixture may be allowed to cool to room temperature.

During this second stage of the process according to the invention the catalytic solid is precipitated.

According to an advantageous alternative form of the process the catalytic solid is subjected to maturing at an elevated temperature of at least 40° C. and lower than the boiling temperature of the solvent employed, for example for a period of approximately from 0.5 to 12 hours. This maturing is preferably performed at a temperature of 45° to 80° C. for at least one hour.

The third stage of the process according to the invention consists in isolating the precipitated catalytic solid from the reaction mixture by any known means such as filtration, centrifuging, or decanting of the supernatant liquid.

In a first individual embodiment of the process according to the invention the precipitated catalytic solid is subjected to washing with an organic liquid chosen from aliphatic hydrocarbons. The preferred organic liquids are linear alkanes such as n-butane, n-hexane and n-heptane, or branched alkanes such as isobutane, isopentane, isooctane and 2,2-dimethylpropane, or cycloalkanes such as cyclopentane and cyclohexane or mixtures thereof. Hexane is particularly suitable. The washing is carried out by bringing the catalytic solid into contact with the organic liquid, for example by dispersing it in the organic liquid. In the case where the catalytic solid is subjected to maturing, the washing is usually performed after the maturing. It is possible, of course, to perform a number of successive washings with the organic liquid.

In a second embodiment of the process according to the invention the reducing-halogenating agent is deposited onto an inorganic support. For this purpose the inorganic support is impregnated with a solution of the reducing-halogenating agent in an organic diluent, so that the reducing-halogenating agent is adsorbed onto the inorganic support. The diluent may be that employed in the second stage of the process, described in detail above. In the case where the support is an inorganic oxide, the latter may be selected from silicon, aluminium, titanium, zirconium and thorium oxides, their mixtures and mixed oxides of these metals, such as aluminium silicate. In the case where the inorganic support is a halide, the latter may be selected, for example, from magnesium chloride and manganese chloride. Silica is preferably employed. Dehydroxylated silica is suitable. The operating conditions of the impregnation are not critical, it being possible for the temperature to vary from room temperature to the boiling temperature of the organic diluent, and the impregnation period being from a few minutes to several hours. In this embodiment of the process according to the invention the inorganic support impregnated with the reducing-halogenated agent is isolated from the organic diluent and then dispersed in the mixture obtained from the first stage, described in detail above.

In a third embodiment of the process according to the invention, which is preferred, the magnesium compound employed in the first stage is magnesium dichloride.

In a first alternative form of this third embodiment magnesium dichloride is mixed with titanium tetrabutylate in such quantities that the molar ratio Ti(O—C$_4$H$_9$)$_4$/MgCl$_2$ is higher than or equal to 2 to ensure the complete dissolution of the magnesium dichloride. Values lower than 5 are recommended, those close to 2 being preferred.

In a second alternative form of this third embodiment, magnesium dichloride is mixed with vanadium tetrabutylate in such quantities that the molar ratio V(O-C$_4$H$_9$)$_4$/MgCl$_2$ is at least 2, preferably at least 5, and does not exceed 20.

In a fourth embodiment of the process according to the invention the magnesium compound employed in the first stage is a magnesium dialcoholate which is used in a quantity such that the molar ratio (M or M')/Mg is higher than or equal to 1. In practice, for reasons of economic nature, there is no advantage in exceeding a molar ratio of 5, values from 1 to 2 being preferred. In this embodiment of the process according to the invention the magnesium dialcoholate is preferably chosen from alcoholates containing up to 20 carbon atoms, magnesium diethylate being especially advantageous. In an alternative form the magnesium dialcoholate may be prepared in situ in the first stage of the process by mixing metallic magnesium and an alcohol in sufficient quantities to obtain the magnesium dialcoholate, to which the transition metal compound of the formula $MY_x$ (O—R')$_{t-x}$ or $M'O_y$(O—R")$_{s-2y}$ is subsequently added.

In an alternative form of this fourth embodiment the catalytic solid collected from the third stage (and optionally subjected to maturing and/or washing) is subjected to a subsequent halogenation with titanium tetrahalide, the halogen in the titanium tetrahalide and those in the reducing-halogenating agent being preferably identical. Particularly satisfactory results are obtained with titanium tetrachloride, chlorine being then selected for the halogens of the reducing-halogenating complex. In this alternative form the catalytic solid originating from the subsequent halogenation may be optionally subjected to maturing and/or washing, the washing and the maturing being performed as described above.

In a fifth embodiment of the process according to the invention, the reducing-halogenating agent of empirical formula $M"(A)Al_2(X',X")_8$ is prepared by reacting the transition metal tetrahalide ($M"X'_4$), the aluminium trihalide ($AlX"_3$), the aromatic hydrocarbon (A) and metallic magnesium which is suspended in an organic solvent which is in most cases the hydrocarbon itself. In general, quantities corresponding to a molar ratio $M"X'_4$:Mg:$AlX"_3$ of 1:(1 to 2):(2 to 6) are used (this ratio being preferably approximately equal to 1:1:2) in an excess of aromatic hydrocarbon. This synthesis is generally carried out under the same operating conditions as those employed during the conventional synthesis of the complex of empirical formula $M"(A)Al_2(X',X")_8$ described in the above-mentioned publications. The operation is advantageously carried out by refluxing the suspension at a temperature which is equal to or slightly higher than the boiling temperature of the aromatic hydrocarbon for a period varying from 1 to 12 hours, by allowing the reaction mixture to cool, by separating off any solid fraction comprising the excess of one of the components used, and by collecting the solution thus obtained. In this embodiment of the process it is advantageous to employ the same halogen for the two compounds $M"X'_4$ and $AlX"_3$.

The process according to the invention makes it possible to obtain a catalytic solid comprising a coprecipitate of a halogen compound of the transition metal M or M' in the trivalent state, of a halogen compound of the transition metal M" in the trivalent state and of a magnesium halide. This catalytic solid generally has a low aluminium content which does not exceed 10% of the weight of the catalytic solid.

The present invention consequently also relates to the catalytic solids comprising a coprecipitate of a magnesium halide and of halides of at least two transition metals chosen from groups IVB and VB of the Periodic Table at least 90% of which (generally at least 95%) by weight has an amorphous structure. The catalytic solids according to the invention have a magnesium content higher than 0.5% of the weight of the catalytic solid, preferably at least equal to 2%, for example at least equal to 5%. This magnesium content is generally at most equal to 20% of the weight of the catalytic solid, preferably at most equal to 18%, values lower than 14% being the most advantageous ones. In the catalytic solids according to the invention the total content of transition metals may reach 30% of the weight of the catalytic solid; it is generally at most equal to 25% and is usually higher than 5%, values of at least 10% being the most common ones. In the catalytic solids according to the invention magnesium halide and the halides of the transition metals may be derived from the same halogen or from different halogens. Preference is given to halides derived from the same halogen, chlorine being especially recommended.

In the catalytic solids according to the invention the different transition metals are generally in a molar ratio of at least 1 and not exceeding 4, this molar ratio being preferably higher than 1.2 and not exceeding 2.8.

The catalytic solids according to the invention have the advantageous individual feature of having an amorphous structure characterised by a homogeneous incorporation of the trivalent transition metals into the magnesium, thus improving their mutual interaction. This has the effect of increasing the activity of the catalytic solids according to the invention. Furthermore, the aluminium content of the catalytic solids according to the invention does not exceed 10% of the weight of the catalytic solid and is generally lower than 9% of this weight, for example from 0.5 to 5%, values which lie between 0.7 and 4% being the most common ones.

Consequently, the catalytic solids according to the invention find a particularly advantageous use in the (co)polymerisation of olefins, making it possible in particular to obtain polyolefins exhibiting a wide molecular weight range.

The catalytic solids according to the invention can be employed for the polymerisation of olefins containing up to 20 carbon atoms per molecule. The olefins advantageously contain from 2 to 12 carbon atoms per molecule and are chosen, for example, from ethylene, propylene, 1-butene, 1-pentene, 3-methyl-1-butene, 1-hexene, 3- and 4-methyl-1-pentenes, 1-octene, 3-ethyl-1-butene, 1-heptene, 3,4-dimethyl-1-hexene, 4-butyl-1-octene, 5-ethyl-1-decene and 3,3-dimethyl-1-butene. The catalytic solids find a particular use in the production of ethylene homopolymers or of copolymers of ethylene with one of a number of olefinically unsaturated comonomers which may contain up to 8 carbon atoms, for example propylene, 1-butene, 1-pentene, 3-methyl-1-butene, 1-hexene, 3- and 4-methyl-1-pentenes and 1-octene. One or more diolefins containing from 4 to 18 carbon atoms may also be copolymerised with ethylene. The diolefins are preferably unconjugated aliphatic diolefins such as 4-vinylcyclohexene and 1,5-hexadiene, or alicyclic diolefins which have an endocyclic bridge, such as dicyclopentadiene, methylene- and ethylidenenorbornene and conjugated aliphatic diolefins such as 1,3-butadiene, isoprene and 1,3-pentadiene.

The catalytic solids according to the invention are particularly suitable for the manufacture of ethylene homopolymers and copolymers containing at least 90%, preferably at least 95%, by weight of ethylene. The preferred comonomers are chosen from propylene, 1-butene, 1-hexene and 1-octene.

The invention consequently also relates to a process for the (co)polymerisation of olefins as are defined above, using a catalytic solid in accordance with the invention. A cocatalyst may optionally be used in addition to the catalytic solid in the (co)polymerisation. Cocatalysts which may be mentioned by way of examples are preferably unhalogenated organoaluminium compounds such as tributyl-, trimethyl-, triethyl-, tripropyl-, triisopropyl-, triisobutyl-, trihexyl-, trioctyl- and tridodecylaluminium. In an advantageous alternative form the (co)polymerisation is performed in the presence of a molecular weight regulator such as hydrogen. The (co)polymerisation may be performed equally well in solution, in suspension or in gaseous phase, and may be carried out continuously or noncontinuously. According to the invention it was preferred to perform the (co) polymerisation in suspension, for example in a hydrocarbon diluent such as liquid aliphatic, cycloaliphatic and aromatic hydrocarbons, in such quantities and at such a temperature that at least 50% (preferably 70%) of the polymer formed is insoluble therein. Preferred hydrocarbon diluents are linear alkanes such as n-butane, n-hexane and n-heptane or branched alkanes such as isobutane, isopentane, isooctane and 2,2-dimethylpropane, or cycloalkanes such as cyclopentane and cyclohexane, or mixtures thereof. The polymerisation temperature is generally chosen from 20° to 200° C., preferably from 50° to 150° C., in particular from 80° to 115° C. The olefin pressure is chosen in most cases between atmospheric pressure and 5 MPa, preferably from 0.2 to 2 MPa, more particularly from 0.4 to 1.5 MPa. In the case where the (co)polymerisation is performed in the presence of hydrogen the partial pressure of hydrogen is advantageously between 0.01 and 0.50 MPa, the ratio of the partial pressures of hydrogen and of the olefin generally not exceeding 3, more particularly not exceeding ⅓.

The examples described in what follows are used to illustrate the invention. In these examples catalytic solids in accordance with the invention have been prepared and have subsequently been employed for polymerising ethylene in suspension. The meaning of the symbols employed in these examples, the units expressing the quantities referred to and the methods for measuring these quantities are explained in detail below.

$\alpha$ = catalytic activity expressed in grams of insoluble polyolefin which are obtained per hour and per gram of catalyst, divided by the partial pressure of ethylene.

[Al] = aluminium content expressed in grams of aluminium per 100 grams of catalytic solid.

HLMI = melt index measured under a load of 21.6 kg at 190° C. and expressed in g/10 min according to ASTM Standard D 1238.

Ol = oligomer content expressed in gram of oligomers per kilogram of polyolefin and measured by extraction with hexane at its boiling temperature.

$\eta_0$ = dynamic viscosity expressed in dPa s and measured at a shear gradient of 1 s$^{-1}$ and at 190° C.

$\eta_2$ = dynamic viscosity expressed in dPa s and measured at a shear gradient of 100 s$^{-1}$ and at 190° C.

$\eta$ = Ratio $\eta_0/\eta_2$ calculated on the basis of the equation $$\eta = 0.307 + 10^{\log \eta'}$$

in which log $$\eta' = 2 \frac{\log(76680/MI_2) - \log \eta_2}{2 - \log(2.53 \times MI_2)}$$

where $MI_2$ = melt index measured under a load of 2.16 kg at 190° C. and expressed in g/10 min.

EXAMPLE 1

A. Preparation of the Catalytic Solid
(i) Preparation of the mixture of the compounds MgX$_n$(OR)$_{2-n}$ and MY$_x$(O—R')$_{t-x}$ 394 mmol of magnesium dichloride, 782 mmol of titanium tetrabutylate and 196 ml of hexane were introduced into a one-litre autoclave fitted with a stirrer. The temperature was then raised to 90° C. and the contents of the autoclave were stirred for 6 hours while the temperature was held at 90° C., until the magnesium dichloride dissolved completely.

(ii) Preparation of the reducing-halogenating complex 21 mmol of aluminium trichloride and 92 mmol of metallic aluminium were introduced into a 250-ml Schlenk reactor fitted with a stirrer, and were then stirred for minutes at 130° C. 50 ml of toluene and 10.1 mmol of titanium tetrachloride were then added to them. The whole was then stirred for 4 hours at the boiling temperature of toluene. The solution was then allowed to cool to room temperature.

(iii) Reduction and halogenation of the mixture from stage (i)

25 ml of the solution obtained in (ii) were introduced into a 250-ml Schlenk reactor fitted with a stirrer, and to this were added 3 ml of the mixture obtained in (i). The precipitated solid was collected from the reaction mixture and subjected to washing with 100 ml of hexane, which was repeated 5 times. The catalytic solid thus obtained had the following characteristic: [Al]=1.7

B. Polymerisation of Ethylene 0.5 l of hexane and 0.4 ml of a solution of 0.35 mM of triethylaluminium as cocatalyst were introduced into a 1.5-litre autoclave at room temperature and atmospheric pressure. The temperature was brought to 85° C. Ethylene at a pressure of 0.6 MPa, hydrogen at a partial pressure of 0.1 MPa and a solution of 1.52 mg of the catalytic solid obtained in A in hexane were then introduced. The temperature and the partial pressure of ethylene were kept constant for a period of 120 minutes after which the ethylene feed was cut off. The polymerisation mixture was then cooled to room temperature and was degassed. 134 g of polyethylene were collected from the suspension by evaporating off the hexane. The following results were obtained:

$\alpha$=7346

HLMI=1.7

Ol=0.3.

EXAMPLE 2

A. Preparation of the Catalytic Solid
(i) Preparation of the mixture of the compounds MgX$_n$(O—R)$_{2-n}$ and MY$_x$(O—R')$_{t-x}$ 167 mmol of titanium tetrabutylate, 83 mmol of magnesium diethylate and 20 ml of hexane were introduced into a one-litre autoclave fitted with a stirrer. The temperature was then raised to 140° C. and the contents of the autoclave were stirred for 4 hours while the temperature was kept at 140° C. until the magnesium diethylate dissolved completely.

(ii) Preparation of the reducing-halogenating complex 112 mmol of aluminiumtrichloride and 408 mmol of metallic aluminium were introduced into a 250-ml Schlenk reactor fitted with a stirrer and were then stirred for 5 hours at 100° C. Then, after cooling to room temperature, 100 ml of toluene and a mixture of 6.1 ml of titanium tetrachloride (55.5 mmol of titanium) and 25 ml of toluene were added. Afterwards the whole was stirred for 5 hours at 130° C. The solution was then cooled to room temperature.

(iii) Reduction and halogenation of the mixture from stage (i)

3 ml of the mixture obtained in (i), 35 ml of hexane, 5 ml of the solution obtained in (ii) and 25 ml of toluene were introduced into a 250-ml Schlenk reactor fitted with a stirrer.

The whole was subjected to maturing while being stirred for one hour at 55° C. The precipitate in the suspension was then selected and washed 3 times with 50 ml of hexane. 10 ml of titanium tetrachloride were then added and the suspension was left to mature for 12 hours at 70° C. with stirring. The precipitated solid was collected from the suspension and then subjected to 5 washings with 50 ml of hexane. The catalytic solid obtained had the following characteristic: [Al]=2.3.

B. Polymerisation of Ethylene

The polymerisation of ethylene was performed as described in Example 1 (B) with the following operational modifications:

partial pressure of ethylene: 0.6 MPa initial partial pressure of hydrogen: 0.1 MPa quantity of cocatalyst used: 0.4 ml of a solution of 0.35 M of triethylaluminium quantity of catalytic solid used: 1.42 mg.

87 g of polyethylene were obtained exhibiting the following characteristics:

$\alpha=5087$

HLMI=2.2

$\eta_0/\eta_2=10.54$

OI=2.7.

EXAMPLE 3

A. Preparation of the Catalytic Solid (i) Preparaation of the mixture of the compounds $MgX_n(O—R)_{2-n}$ and $MY_x(O—R')_{r-x}$ 422 mmol of magnesium dichloride, 285 mmol of vanadium tetrabutylate, 2 ml of butanol and 50 ml of hexane were introduced into a one-litre flask with 4 orifices and fitted with a stirrer and a reflux condenser. The temperature was taken to 110° C. and the mixture was stirred for 7 hours at 110° C. It was then cooled to room temperature. Afterwards, the supernatant liquid was transferred into a one-litre flask. 150 ml of hexane were added to the remaining solid and the dispersion thus obtained was kept at 110° C. for 8 hours. Next, after having been cooled to room temperature, the liquid fraction was extracted therefrom and was combined with the above mentioned supernatant liquid.

(ii) Preparation of the reducing-halogenating complex 290 mmol of aluminium trichloride, 481 mmol of metallic aluminium and 150 ml of toluene were introduced into a 250-ml flask with three openings and fitted with a stirrer. The temperature was raised until the toluene refluxed. A solution of 15 ml of titanium tetrachloride and 15 ml of toluene was then added dropwise. Afterwards the mixture was refluxed for 20 hours with stirring. After cooling to room temperature and removal of excess aluminum and aluminium tetrachloride by filtration, the filtrate was treated with 300 ml of hexane. The precipitated solid was collected by filtration and was washed twice with 50 ml of hexane and dried at reduced pressure for 4 hours at room temperature.

(iii) Reduction and halogenation of the mixture from stage (i)

12.4 g of the solid obtained in (ii) and 50 ml of toluene were introduced into a 200-ml Schlenk reactor fitted with a stirrer and were stirred at room temperature until the solid dissolved in the toluene. 17 ml of the solution obtained in (i) were then added dropwise with stirring. The temperature of the reaction mixture rose under the effect of the exothermic nature of the reaction. When the reaction ended the reaction mixture was allowed to cool to room temperature. 40 ml of hexane were then added to it and, after precipitation of the solid, the supernatant liquid was separated off and the precipitate washed 5 times with 50 ml of hexane per washing.

B. Polymerisation of Ethylene

To polymerise ethylene the operation was carried out as described in Example 1 (B) with the following operational modifications:

partial pressure of ethylene: 0.6 MPa initial partial pressure of hydrogen: 0.2 MPa quantity of cocatalyst used: 0.5 ml of a solution of 40 g/l of triethylaluminium quantity of catalytic solid used: 9 mg. 108 g of polyethylene exhibiting the following characteristics were obtained:

$\alpha=2222$

HLMI=6.4

$\eta=9.2$

OI=9.9.

EXAMPLE 4

A. Preparation of the Catalytic Solid (i) Preparation of the mixture of the compounds $MgX_n(O—R)_{2-n}$ and $MY_x(O—R')_{r-x}$ 377 mmol of magnesium dichloride, 754 mmol of titanium tetrabutylate and hexane up to a final volume of 450 ml were introduced into a one-litre flask fitted with a stirrer and a reflux condenser. The temperature was raised until the hexane refluxed. The mixture was then stirred and refluxed for 4 hours until the magnesium dichloride dissolved completely. Afterwards the solution was cooled to room temperature.

(ii) Preparation of the reducing-halogenating complex and reduction and halogenation of the mixture obtained in (i)

252 mmol of aluminium, 515 mmol of aluminium trichloride and toluene up to a final volume of 310 ml were introduced into a half-litre flask fitted with a stirrer. 16 ml of the suspension thus obtained were withdrawn and transferred, with 19.6 mmol of zirconium tetrachloride, into another half-litre flask fitted with a stirrer and a reflux condenser. The temperature was then raised and the mixture was refluxed for 10 hours until a solution was obtained, to which 70 ml of the solution obtained in (i) were then added. Afterwards this mixture was diluted with 60 ml of hexane and was refluxed for 30 minutes at 60° C. After the mixture had been cooled to room temperature the precipitated solid was collected and washed 8 times with 40 ml of hexane per washing. The catalytic solid obtained exhibited the following characteristic: [Al]=1.5.

B. Polymerisation of Ethylene

To polymerise ethylene the operation was carried out as described in Example 1 (B) with the following operational modifications:

partial pressure of ethylene: 0.6 MPa initial partial pressure of hydrogen: 0.2 MPa quantity of cocatalyst used: 1.5 ml of a solution of 0.40 g/l of triethylaluminium quantity of catalytic solid used: 9 mg. 108 of polyethylene exhibiting the following characteristics were obtained:

$\alpha=1306$

HLMI=11.12

$\eta=6.5$

OI=2.3.

EXAMPLE 5

A. Preparation of the Catalytic Solid (i) Preparation of the mixture of the compounds $MgX_n(O-R)_{2-n}$ and $MY_x(O-R')_{t-x}$ 422 mmol of magnesium dichloride, 285 mmol of vanadium tetrabutylate, 2 ml of butanol and 50 ml of hexane were introduced into a one-litre flask with 4 openings and fitted with a stirrer and a reflux condenser. The temperature was taken to 110° C. and the mixture was stirred at 110° C. for 7 hours. It was then cooled to room temperature. Afterwards the supernatant liquid was transferred into a one-litre flask. 150 ml of hexane were added to the remaining solid and the dispersion thus obtained was kept at 110° C. for 8 hours. Next, after it had been cooled to room temperature, the liquid fraction was extracted from it and was combined with the above mentioned supernatant liquid.

(ii) Preparation of the reducing-halogenating complex and reduction and halogenation of the mixture obtained in (i)

15.8 mmol of zirconium tetrachloride, 60 ml of toluene and 20.5 ml of a solution containing 15.8 mmol of metallic magnesium and 31.6mmol of aluminiumtrichloride were introduced into a 200-ml Schlenk reactor fitted with a stirrer and were then stirred for 7 hours at 100° C. Then, after cooling to room temperature, 15.8 ml of the solution obtained in (i) were added to it dropwise. The whole was then stirred for 1.5 hours at 85° C. The solution was then cooled to room temperature. The supernatant liquid was separated off and the resulting solid washed 5 times with 50 ml of hexane per washing. The catalytic solid thus obtained exhibited the following characteristic: [Al]=8.7.

B. Polymerisation of Ethylene

To polymerise ethylene the operation was carried out as described in Example 1 (B) with the following operational modifications:

partial pressure of ethylene: 0.6 MPa initial partial pressure of hydrogen: 0.1 MPa quantity of cocatalyst used: 1.5 ml of a solution of 40 g/l of triisobutylaluminium quantity of catalytic solid used: 20 mg.

104 g of polyethylene exhibiting the following characteristics were obtained:

α=433

HLMI=3.6

Ol=41.

EXAMPLE 6

A. Preparation of the Catalytic Solid (i) Preparation of the mixture of the compounds $MgX_n(O-R)_{2-n}$ and $MY_x(O-R')_{t-x}$ 377 mmol of magnesium dichloride, 754 mmol of titanium tetrabutylate and hexane up to a final volume of 450 ml were introduced into a one-litre flask fitted with a stirrer and a reflux condenser. The temperature was raised until the hexane refluxed. The mixture was then stirred and refluxed for 4 hours until the magnesium dichloride dissolved completely. Afterwards the solution was cooled to room temperature.

(ii) Preparation of the reducing-halogenating complex and reduction and halogenation of the mixture obtained in (i)

5.68 g of silica (previously activated in a fluidised bed at 800° C. for 20 hours under nitrogen), 80 ml of toluene and 40 ml of a solution obtained by dissolving 4.63 g of the reducing-halogenating complex obtained in Example 3 (A, ii) in 50 ml of toluene were introduced into a 200-ml Schlenk reactor fitted with a stirrer. The mixture was then stirred for a few minutes at room temperature. After precipitation of the solid the liquid phase was separated off and the remaining solid was subjected to two washings, each washing being carried out with 40 ml of hexane. The solid was then suspended in 50 ml of hexane and 9 ml of the solution obtained in (i) were added to it with stirring. The temperature of the reaction mixture increased under the effect of the exothermic nature of the reaction. At the end of the reaction, the reaction mixture was allowed to cool to room temperature and the catalytic solid was collected from the suspension. It exhibited the following characteristic: [Al]=2.0.

B. Polymerisation of Ethylene

To polymerise ethylene the operation was carried out as described in Example 1 (B) with the following operational modifications:

partial pressure of ethylene: 0.6 MPa initial partial pressure of hydrogen: 0.1 MPa quantity of cocatalyst used: 0.6 ml of a solution of 0.40 g/l of triethylaluminium polymerisation period: 330 minutes quantity of catalytic solid used: 9 mg.

116 g of polyethylene exhibiting the following characteristics were obtained:

α=385

HLMI=3.6

η=6.1

Ol=5.9.

What is claimed is:

1. The process for the manufacture of a catalytic solid, comprising:

a) mixing at least one magnesium compound chosen from the group consisting of Mg oxide and compounds of formulae $MgX_n(O-R)_{2-n}$, and at least one transition metal compound selected from the group consisting of compounds of formulae $MY_x(O-R')_{t-x}$ and $M'O_y(O-R'')_{s-2y}$ in which X denotes a halogen each of M and M' denotes a transition metal chosen from the group consisting of the elements of groups IVB and VB of the Periodic Table, the valency of which is at least equal to 4

Y denotes a halogen or a group (O—R''')

each of R, R', R'' and R''' denotes an alkyl, aryl or cycloalkyl group containing up to 20 carbon atoms $0 \leq n \leq 2$ $0 \leq x \leq t$, t being equal to the valency of M $0 \leq y \leq s/2$, being equal to the valency of M', to obtain a solution comprising a complex of said at least one magnesium compound with said at least one transition metal compound, b) reducing and halogenating the solution of the complex thus obtained by contacting it with a reducing-halogenating agent, in order to precipitate a catalytic solid, comprising an amorphous coprecipitate of a halogen compound of a transition metal M or M' in the trivalent state, a halogen compound of a transition metal M'' in the trivalent state, and a magnesium halide, and c) isolating the precipitated catalytic solid thus obtained from the solution, wherein the reducing-halogenating agent consists essentially of at least one complex of empirical formula $M''(A)Al_2Cl_8$ in which M'' denotes a transition metal of group IVB of the Periodic Table, and A denotes an aromatic hydrocarbon.

2. The process according to claim 1, wherein the compound of transition metal M or M', the magnesium compound and the complex [M"(A)Al$_2$(X', X")$_8$]M"(A)Al$_2$Cl$_8$ are used in quantities such that the molar ratio (M or M')/Mg is from 1 to 20 and that the molar ratio M"/(M or M') is from 0.3 to 1.

3. The process according to claim 1, wherein the at least one magnesium compound is mixed with the at least one transition metal compound in at least one organic solvent selected from the group consisting of toluene and hexane and the complex M"(A)Al$_2$Cl$_8$ is used in the form of a solution in toluene.

4. The process according to claim 1, wherein at least one magnesium compound is mixed with the at least one transition metal compound at a temperature of 50° to 135° C.

5. The process according to claim 1, including treating the precipitated catalytic solid at a temperature of at least 40° C. and lower than the solvent boiling point and for a period of approximately from 0.5 to 12 hours.

6. The process according to claim 1, wherein the catalytic solid is subjected to washing with an organic liquid chosen from the group consisting of aliphatic hydrocarbons.

7. The process according to claim 6, including washing the precipitated catalytic solid after treatment at a temperature of at least 40° C. and lower than the solvent boiling point for a period of approximately 0.5 to 12 hours.

8. The process according to claim 1, wherein the reducing-halogenating agent is chosen from the group consisting of those corresponding to the empirical formula Ti(toluene)Al$_2$Cl$_8$ and Zr(toluene)Al$_2$Cl$_8$.

9. The process according to claim 1, wherein the reducing-halogenating agent is deposited on an inorganic support.

10. The process according to claim 9, wherein in order to deposit the reducing-halogenating agent on the inorganic support, the inorganic support is impregnated with a solution of the reducing-halogenating agent in a diluent chosen from aromatic hydrocarbons.

11. The process according to claim 9, wherein the inorganic support is dehydroxylated silica.

12. The process according to claim 1, wherein the compound corresponding to one of the formulae MY$_x$(O—R')$_{t-x}$ and M'O$_y$(O—R")$_{s-2y}$ is selected from the group consisting of those in which M or M' is Ti, V or Zr.

13. The process according to claim 12, wherein the compound MY$_x$(O—R')$_{t-x}$ is selected from the group consisting of titanium tetrabutylate and vanadium tetrabutylate.

14. The process according to claim 1, wherein the compound MgX$_n$(O—R)$_{2-n}$ is a magnesium dialcoholate which is used in a quantity such that the molar ratio (M or M')/Mg is from 1 to 2.

15. The process according to claim 14, wherein, after the isolation of the precipitated catalytic solid from the reaction mixture, the said catalytic solid is treated with titanium tetrahalide in which the halogen is identical with that of the reducing-halogenating agent used.

16. The process according to claim 15, wherein the precipitated catalytic solid is treated with titanium tetrachloride.

17. The process according to claim 15, wherein, after the treatment with titanium tetrahalide, the catalytic solid is subjected to washing with an organic liquid chosen from the group consisting of aliphatic hydrocarbons.

18. The process according to claim 6, wherein the organic washing liquid is hexane.

19. The process according to claim 1, wherein the magnesium compound is chosen from the group consisting of magnesium dichloride and magnesium diethylate.

20. The process according to claims 13, wherein, in the case where the compound MY$_x$(O—R')$_{t-x}$ is titanium tetrabutylate and the magnesium compound is magnesium dichloride, a molar ratio Ti(O—C$_4$H$_9$)$_4$/MgCl$_2$ of at least 2 is used.

21. The process according to claims 13, wherein, in the case where the compound MY$_x$(O—R')$_{t-x}$ is vanadium tetrabutylate and the magnesium compound is magnesium dichloride, a molar ratio V(O—C$_4$H$_9$)$_4$/MgCl$_2$ of 2 to 20 is used.

22. The process according to claim 1, wherein the reducing-halogenating agent of empirical formula M"(A)Al$_2$Cl$_8$ is prepared by reacting a transition metal tetrachloride M"Cl$_4$, an aluminium trichloride AlCl$_3$, an aromatic hydrocarbon A with metallic magnesium suspended in an organic solvent, refluxing the suspension so obtained at a temperature which is equal to or slightly higher than the boiling temperature of the aromatic hydrocarbon for a period varying from 1 to 12 hours, allowing the reaction mixture to cool, separating off any solid fraction comprising an excess of one of the components used, and collecting the solution thus obtained containing the reducing-halogentaing agent, where:

M" denotes a transition metal of group IVB of the Periodic Table.

23. A catalytic solid manufactured by the process of claim 1 comprising a coprecipitate of a magnesium halide and of halides of at least two different transition metals selected from groups IVB and VB of the Periodic Table, in which at least 90% by weight has an amorphous structure.

24. The catalytic solid according to claim 23, having a content of transition metals of 5 to 30% of the weight of the catalytic solid, a magnesium content of 0.5% to 20% of the weight of the catalytic solid, and an aluminium content of 0.5 to 10% of the weight of the catalytic solid.

25. The catalytic solid according to claim 23, wherein the transition metals are in a molar ratio of 1 to 4.

26. The catalytic solid according to claim 23, wherein the halides of the two transition metals are chlorides.

27. A process for the polymerisation of at least one olefin, according to which a catalytic solid in accordance with claim 23 is contacted with said at least one olefin.

28. The process according to claim 27, wherein the olefin is ethylene.

* * * * *

UNITED STATES PATENT AND TRADEMARK OFFICE
CERTIFICATE OF CORRECTION

PATENT NO. : 5,631,334
DATED : May 20, 1997
INVENTOR(S) : Nicola ZANDONA

It is certified that error appears in the above-indentified patent and that said Letters Patent is hereby corrected as shown below:

Please correct Claim 2 at Column 13, line 2 as follows: --
   2. The process according to claim 1, wherein the compound of transition metal M or M', the magnesium compound and the complex M''(A)Al$_2$Cl$_8$ are used in quantities such that the molar ratio (M or M')/Mg is from 1 to 20 and that the molar ratio M''(M or M') is from 0.3 to 1. --

Please correct claim 22, at column 14, line 33 to read as follows: --
thus obtained containing the reducing-halogenating agent, -- .

Signed and Sealed this

Ninth Day of December, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,631,334
DATED : May 20, 1997
INVENTOR(S) : Nicola ZANDONA

It is certified that error appears in the above-indentified patent and that said Letters Patent is hereby corrected as shown below:

Claim 2, Column 13, line 2, should read as follows:

-- 2. The process according to claim 1, wherein the compound of transition metal M or M', the magnesium compound and the complex M''(A)Al$_2$Cl$_8$ are used in quantities such that the molar ratio (M or M')/Mg is from 1 to 20 and that the molar ratio M''/(M or M') is from 0.3 to 1. --

Signed and Sealed this

First Day of September, 1998

Attest:

BRUCE LEHMAN

Attesting Officer

Commissioner of Patents and Trademarks